March 25, 1969　　J. T. KUTNEY ET AL　　3,434,679
SIMULATED REACTION ENGINE MODEL
Filed May 9, 1966
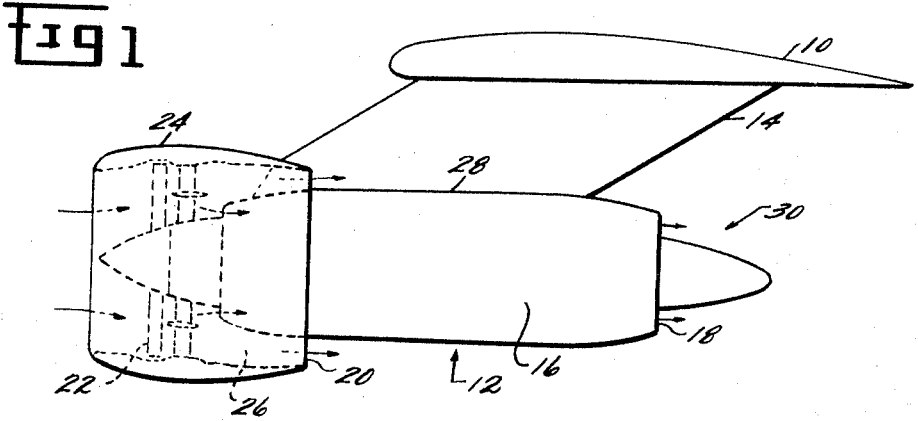
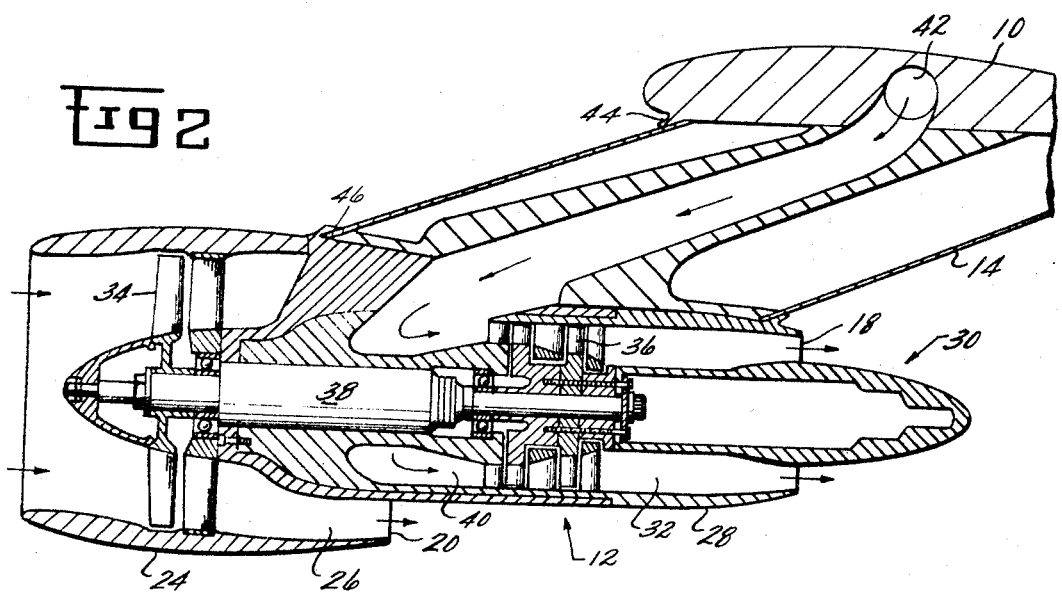
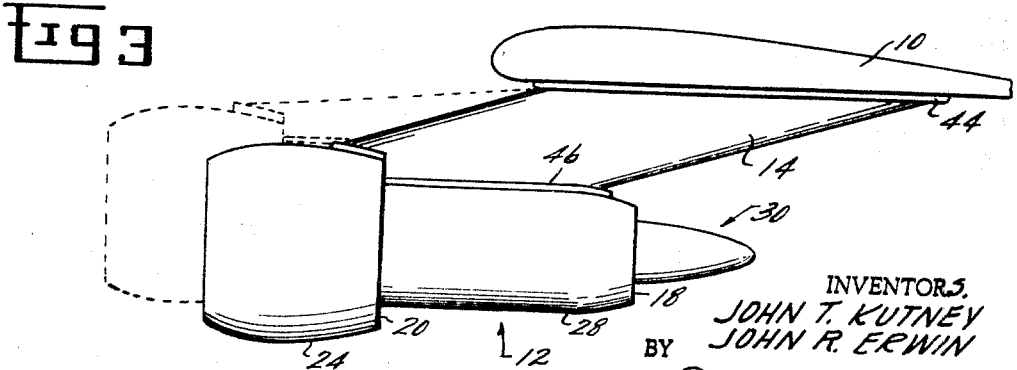
INVENTORS.
JOHN T. KUTNEY
JOHN R. ERWIN
BY
ATTORNEY

United States Patent Office 3,434,679
Patented Mar. 25, 1969

3,434,679
SIMULATED REACTION ENGINE MODEL
John T. Kutney, Wyoming, and John R. Erwin, Cincinnati, Ohio, assignors to General Electric Company, a corporation of New York
Filed May 9, 1966, Ser. No. 548,629
Int. Cl. G01m 9/00; B64d 33/00
U.S. Cl. 244—53                                              3 Claims

ABSTRACT OF THE DISCLOSURE

A simulation model for simulating the in-flight aerodynamic characteristics of a ducted fan type turbojet engine and having an external configuration similar to the engine simulated and including a fan disposed within an annular casing and turbine means for driving the fan. The external configuration of the model is sized in predetermined reduced lineal scale to the engine simulated and the fan and turbine means are sized to develop a pressure ratio across the fan substantially similar to the pressure ratio across the simulated engine fan and a mass flow rate reduced in relation to the mass flow rate of the simulated engine by substantially the square of the predetermined reduced lineal scale.

---

The present invention is related to a simulated reaction engine model and, more particularly, to a combustorless simulated jet engine model structure that is designed to accurately predict full scale aerodynamic characteristics on an airframe structure.

It has long been customary to provide model structures for simulating the actual full scale vehicle in a variety of applications. This technique has been used in aircraft and engine combinations, in automobile models, and in a wide variety of applications. The need for the model simulator is simply one to reduce time and cost in order to determine the characteristics of the full scale operating vehicle. In the aircraft art, there has historically been a great deal of difficulty in correlating full scale operating data with scale model wind tunnel test data. Therefore when the vehicle, such as the airplane, is built and flown the airplane drag characteristics are considerably higher than the values determined and predicted from the wind tunnel tests. One of the reasons for these inaccurate results has been that the propulsion system has not been properly tested in the wind tunnel due to the inability to simulate the proper internal flows of the propulsion system with the normal models used. Consequently, the answers obtained from the test programs are grossly in error and full scale verification cannot be obtained which has resulted in costly delays and poor full scale performance. Generally, in the aircraft art, it has been customary to build a model and to provide a simulated engine by means of a nacelle with an opening through it to allow free stream flow to pass through the simulated engine. Since an actual engine has an intake with suction and an exit with high pressure exhaust air, there is a very complex and unpredictable aerodynamic interaction between the engine and the airframe structure. This interaction cannot be predicted unless the inlet and exit conditions occur as they exist in the actual engine—namely, by the provision of suction nozzle pressure ratios, and exhaust flow. Obviously, it is impractical to build a small scale model of the actual engine because of the size of the parts and the cost of a miniature engine. Furthermore, scaling of such a model is not necessarily a guarantee of the accurate output of the engine.

The main object of the present invention is to provide a simulated reaction engine model structure which, with the airframe structure, acts exactly as the full scale engine will act with predictable results which can be scaled.

A further object is to provide such a model structure which, geometrically and aerodynamically, acts in all capacities as though it were an actual engine having inlet suction nozzle, pressure ratios, mass flow, and exhaust as does the full scale engine.

Another object is to provide such a model structure with the length and cross section of a predetermined proportion to the full sized engine but which is a combustorless model.

Still another object is to provide such a model which contains a miniature compressor and turbine that are sized to produce a pressure ratio and mass flow of predetermined proportions to the full sized engine.

An additional object is to provide such a model structure which is movable to vary its position with respect to the airframe structure to provide the maximum amount of aerodynamic information from scale model testing.

Briefly stated, there is provided a simulated combustorless jet engine model structure which comprises an outer tubular casing or nacelle that has an inlet equivalent to a jet engine. An inner concentric tubular casing is provided to form a first fluid flow passage between the inner and outer casings and the casings define a first exhaust nozzle means therebetween in the conventional fashion. A compressor means, that may be carried by the inner casing, is provided to move fluid through the flow passage. The casings and the passage have a length and cross section of a predetermined proportion to the full sized engine. An annular chamber is provided within the casings and downstream of the compressor in the section where a normal combustor would be provided. A turbine means is provided in a second passage and is drivingly connected to the compressor. Both the compressor and turbine are sized to produce pressure ratios and mass flows through the flow passages of predetermined proportions to the full sized engine. By a further aspect of the invention, means are provided to support the model on an airframe structure and the model is driven by fluid supplied through the supporting means to the chamber, the fluid driving the turbine and exhausting through a second nozzle. The support means includes means to vary the position, such as the longitudinal and vertical position, of the model with respect to the airframe structure. The scale model may be hung from either a wing or a fuselage of a simulated aircraft in predetermined proportion to the full sized airframe.

While the specification concludes with claims particularly pointing out and distinctly claiming the subject matter which is regarded as the invention, it is believed that the invention will be better understood from the following description taken in connection with the accompanying drawings in which:

FIG. 1 is an elevation view of a typical front fan powerplant supported from an aircraft wing as simulated by the instant invention;

FIGURE 2 is a partial sectional view of the simulated model illustrating the flow through the model; and FIGURE 3 is an outline of the model illustrating the different positions with respect to a wing or fuselage and showing means to vary the position of the model with respect to the airframe.

The invention is applicable to aft fan powerplants as well as cruise fans or a straight turbojet. Typically, the invention is described in connection with a front fan powerplant of the high bypass ratio type with a concentric inner simulated jet engine wherein the fan cowling does not extend completely back to the rear of the jet engine although the invention is equally applicable to such an installation. High bypass ratio fans may be considered as those in which the ratio of the fluid passing through the fan to the jet engine may be as high as eight to one or above.

Referring first to FIGURE 1, there is shown a front fan powerplant of the general type that the instant invention is intended to simulate. To this end, an adjacent aircraft structure such as wing or fuselage 10 may support an engine model generally indicated at 12 by any suitable means such as a strut or pylon structure 14. Of course, it is required only that the engine be supported on the airframe structure and, for the illustration shown, it is convenient to do this by the pylon 14. Engine 12 may be of the front fan concentric type which employs a inner jet engine 16 discharging through a nozzle 18 to provide thrust. An additional nozzle 20 may be provided when a front fan is used in the well known manner. For convenience of description, a concentric and circular arrangement will be described although the invention is not limited to circular nacelles. In order to provide additional thrust in the well known manner, a fan 22 concentric with the engine 16 extending radially beyond the engine is provided. The fan 22 is surrounded by an outer tubular casing 24 which is larger in diameter than the engine and spaced from the engine to form a bypass passage 26 for additional thrust by movement of relatively large masses of lower velocity air in a well known manner. As described, this is a front fan engine. It will be appreciated that the outer casing 24 and inner concentric casing 28 may, in a straight turbojet, form the two walls of the conventional fluid flow passage such as 19 in U.S. Patent No. 3,035,759 of common assignment. Thus, as shown in FIGURE 1, the high bypass fan engine has two nozzles 20 and 18, the latter formed in conjunction with plug 30.

Referring now to FIGURE 2, it is desired that the simulated engine model be as complete with respect to the full scale engine as possible. To this end, it is necessary that the model have a suction inlet and an exhaust in a predetermined proportion to the full sized engine so that the rather complex aerodynamic interactions between the engine structure and the adjacent airframe, either wing or fuselage structure 10, may be accurately measured in order to predict full scale installed performance (heretofore impossible) without constantly miscalculating the drag associated with the engine. Thus, as a first step, the length and cross section of the casings 24 and 28 as well as the fluid passage means 26 and 32 are of a predetermined proportion to the full sized engine. In other words, they are made to the exact scale, e.g., one fifth of the full size engine.

Very importantly however, also to simulate accurately the pressure ratios and mass flow, the inner casing may carry a suitable compressor means 34 to move fluid through the passage 26 or, in the case of a straight jet engine, through the equivalent fluid passage. The compressor may be driven by any suitable means, including electric, but preferably by a connected turbine means 36 which, for the illustration described, is downstream of the compressor and drivingly connected to the compressor by a shaft 38. Such a fan 34 and turbine 36 may be accurately simulated for the purpose needed, to produce suction and exhaust. Because of the impossibility of providing a complete engine in scaled version, the simulated model is a combustorless engine that may be driven by an externally supplied fluid. However, the model may be provided with an annular chamber 40 within the casings and downstream of the compressor. This chamber substitutes for the normal combustion means in a full size jet engine and is used in the same position and in lieu thereof. In order to provide meaningful and aerodynamically desired interaction effects, both the compressor 34 and the turbine 36 are also sized to produce a pressure ratio and a mass flow through the passages of predetermined proportions to the full size simulated engine, the pressure ratio being substantially identical to those of the actual engine and the mass flow having substantially the same proportion as the geometric dimensions, e.g., one twenty-fifth of the full size mass flow where the length, width and height are one-fifth of full size and the cross section or area is one twenty-fifth of full size, it being understood that the mass flow will vary as the area and hence as the square of the lineal reduction scale. The driving or motive fluid for the turbine may be supplied from any suitable outside source 42 to pass through the pylon supporting means 14 and connected to chamber 40 whereby the driving fluid operates the turbine and exhausts through nozzle 18.

In order to provide wide flexibility to determine the best minimum drag arrangement, the device described is provided with means to vary its position with respect to the adjacent airframe structure. Referring to FIGURE 3, any suitable means for varying the position of the simulated model from the solid line position shown to the dotted line position shown may be employed. It is desired that the longitudinal and vertical position of the model be changeable with respect to the airframe structure so that a complete envelope of positions may be studied and test data taken. As shown in FIGURE 3, suitable different airfoil shaped pylons may be provided to nest in a cup arrangement 44 and 46 on the airframe and engine respectively in order to vary the position. In actual practice, different pylons are used as the most expedient means of varying the position. However, any suitable adjusting means that varies the longitudinal and vertical position of the model with respect to the airframe structure is satisfactory. In scale model size, where all parts are of predetermined proportion to the full size engine and fuselage or wing, it is easier and cheaper to provide different pylons in order to obtain the different positionings of the engine.

Thus, the simulated combustorless jet engine or powered nacelle model described is a very accurate performance model of the full size engine. It is sized in length, diameter, and mass flow in direct proportion to the full size engine and, more importantly, with the provision of the combustorless arrangement shown, it provides essentially the same pressure ratios as the full size engine for the aerodynamic reaction effects with the adjacent airframe. Further, the provision of means to vary the position of the model with respect to the airframe structure provides a complete envelope for test data whereby the resultant drag of the full size aircraft may be predicted with extreme accuracy far beyond any heretofore obtainable.

While there has been described a preferred form of the invention, obvious modifications and variations are possible in light of the above teachings. It is therefore to be understood that the invention may be practiced otherwise than as specifically described.

We claim:
1. An apparatus for simulating the in-flight aerodynamic characteristics of a turbojet engine of the type having a fan disposed in an annular cowling, a compressor, a combustor and turbomachinery for driving said fan and said compressor and disposed in a nacelle structure projecting into said cowling, said apparatus including:
   a first annular casing having an annular fan inlet;
   a second annular casing projecting into said first annular casing and forming in conjunction therewith an annular fan exhaust nozzle;
   a fan disposed in said first annular casing intermediate said fan inlet and said fan exhaust nozzle and rotatably carried by said second annular casing;
   said second annular casing formed with an annular chamber, an annular passage, and means for delivery of an externally generated motive fluid into said annular chamber, said annular passage communicating at one end with said annular chamber and terminating at the other end in a turbine exhaust nozzle;
   turbine means carried by said second annular casing and disposed within said annular passage interme- diate said chamber and said turbine exhaust nozzle for rotatably driving said fan and hence air through said first annular casing in response to said motive fluid; with said first annular casing and said second annular casing sized to a small scale in predetermined reduced proportion to the scale of the cowling and nacelle of said turbojet engine to be simulated; and said fan and said turbine means sized to produce a pressure ratio across said fan substantially identical to the pressure ratio created by said simulated turbojet engine fan and a mass flow rate of air through said first annular casing reduced in relation to the mass flow rate of air through said simulated turbojet engine cowling by substantially the square of said predetermined small scale.

2. The apparatus of claim 1 further characterized by and including means for supporting said apparatus from an airframe structure, with said motive fluid delivery means comprising a passage formed in said supporting means.

3. The apparatus of claim 1 further characterized in that said predetermined small scale is approximately one fifth of the scale of the turbojet engine to be simulated.

References Cited

UNITED STATES PATENTS

| | | | |
|---|---|---|---|
| 2,409,177 | 10/1946 | Allen et al. | 60—226 |
| 2,604,277 | 7/1952 | Anxionnaz. | |
| 2,820,599 | 1/1958 | Ackeret et al. | |
| 3,038,683 | 6/1962 | Rowe | 244—12 |
| 3,212,733 | 10/1965 | Kutney | 244—12 X |
| 3,327,965 | 6/1967 | Bockrath | 244—54 |
| 3,368,352 | 2/1968 | Hewson | 60—224 |

MILTON BUCHLER, *Primary Examiner.*

JAMES E. PITTENGER, *Assistant Examiner.*

U.S. Cl. X.R.

60—226; 73—147